(12) United States Patent
Liu

(10) Patent No.: US 7,970,445 B2
(45) Date of Patent: Jun. 28, 2011

(54) SEMIAUTOMATIC SLIDING STRUCTURE

(75) Inventor: Li-Chuan Liu, Tao Yuan Shien (TW)

(73) Assignee: Quanta Computer Inc., Tao Yuan Shien (TW)

( * ) Notice: Subject to any disclaimer, the term of this patent is extended or adjusted under 35 U.S.C. 154(b) by 732 days.

(21) Appl. No.: 11/976,033

(22) Filed: Oct. 19, 2007

(65) Prior Publication Data

US 2008/0185947 A1    Aug. 7, 2008

(30) Foreign Application Priority Data

Feb. 7, 2007    (TW) .............................. 96202386 U

(51) Int. Cl.
*H04M 1/00*    (2006.01)
(52) U.S. Cl. .................................. 455/575.4
(58) Field of Classification Search .................. 108/102, 108/137, 143; 312/319.1, 334.44, 334.46; 455/575.4
See application file for complete search history.

(56) References Cited

U.S. PATENT DOCUMENTS

| | | | |
|---|---|---|---|
| 7,084,345 B1 * | 8/2006 | Chen et al. ..................... | 174/545 |
| 2004/0239220 A1 * | 12/2004 | Yang ......................... | 312/334.44 |
| 2005/0095995 A1 * | 5/2005 | Bae .............................. | 455/90.3 |
| 2006/0142073 A1 * | 6/2006 | Gordecki .................... | 455/575.4 |
| 2007/0155451 A1 * | 7/2007 | Lee ............................. | 455/575.4 |
| 2007/0249394 A1 * | 10/2007 | Bong Doo ................. | 455/556.1 |
| 2008/0200222 A1 * | 8/2008 | Jang et al. .................. | 455/575.4 |
| 2008/0232070 A1 * | 9/2008 | Kuwajima et al. ............ | 361/727 |
| 2008/0254844 A1 * | 10/2008 | Lee ............................ | 455/575.4 |

FOREIGN PATENT DOCUMENTS

KR    20-0396258    *   9/2005

* cited by examiner

*Primary Examiner* — Darnell M Jayne
*Assistant Examiner* — Matthew W Ing
(74) *Attorney, Agent, or Firm* — Rabin & Berdo, PC

(57) ABSTRACT

A semiautomatic sliding structure of an electronic device includes a first sliding member, a second sliding member, a guide member with pillar shape, and an extension spring. The first sliding member has a first sliding structure. The second sliding member is arranged on the first sliding member. The guide member with pillar shape is arranged between the first sliding member and the second sliding member, and pivoted on the first sliding member. The extension spring is slipped onto the guide member and hooked onto the second sliding member.

20 Claims, 9 Drawing Sheets

SEMIAUTOMATIC SLIDING STRUCTURE

RELATED APPLICATION

This application claims priority to Taiwan Application Serial Number 96202386, filed Feb. 7, 2007, which is herein incorporated by reference.

BACKGROUND

1. Field of Invention

The present invention relates to a sliding structure. More particularly, the present invention relates to a semiautomatic sliding structure.

2. Description of Related Art

The semiautomatic sliding structure has been applied on the various electronic devices. A common semiautomatic sliding structure uses the torsion spring as an elastic device. Please refer to FIG. 1. FIG. 1 depicts the torsion spring 100. When the semiautomatic sliding structure is sliding, the deformation portion of the torsion spring 100 is at a position between the spring arm 102 and the volute coil 104. Due to this kind of non-uniform deformation, the torsion spring 100 is usually snapped at the deformation portion. Then the semiautomatic sliding structure is broken, and the life time of the electronic devices included the semiautomatic sliding structure is reduced.

Therefore, it is desirable to improve the semiautomatic sliding structure to increase the life time of the electronic devices included the semiautomatic sliding structure.

SUMMARY

The current embodiment describes a semiautomatic sliding structure for an electronic device. The semiautomatic sliding structure includes a first sliding member, a second sliding member, a guide member, and an extension spring. The first sliding member has a first sliding structure. The second sliding member is arranged on the first sliding member. The second sliding member has a second sliding structure and a rotation structure. The second sliding structure arranged with respect to the first sliding structure so that the second sliding member and the first sliding member slide relatively to each other. The guide member is of a pillar shape and is arranged between the first sliding member and the second sliding member. The guide member has a first end and a second end. The first end is pivoted on a pivot point of the first sliding member so that the guide member rotates on the surface of the first sliding member between a fixed angle.

The extension spring is slipped onto the second end. The extension spring includes a stopper end and a hook. The stopper end and the hook are arranged on two ends of the extension spring respectively. The cross section area of the stopper end is smaller than the cross section area of the guide member. The hook is hooked onto the rotation structure.

According to one embodiment of the invention, a semiautomatic sliding structure for an electronic device is provided. The semiautomatic sliding structure includes a first sliding member, a second sliding member, a plurality of extension springs, and a plurality of guide members. The first sliding member has a first sliding structure. The second sliding member is arranged on the first sliding member. The second sliding has a second sliding structure and a plurality of rotation structures. The second sliding structure is arranged with respect to the first sliding structure so that the second sliding member and the first sliding member slide relative to each other. The plurality of extension springs are arranged between the first sliding member and the second sliding member. The extension springs have a stopper end and a hook. The stopper end and the hook are arranged on two ends of the extension springs respectively. The cross section area of the stopper end side of the extension springs is smaller than the cross section area of the hook side of the extension springs. The hook is hooked onto the rotation structure. The plurality of guide members are of pillar shapes and the cross section area of the guide members are larger than the cross section area of the stopper end side of the extension springs. The guide members have a first end and a second end. The first end is pivoted on a pivot point of the first sliding member. The extension spring is slipped onto the second end. When the second sliding member and the first sliding member slide relative to each other, the guide members are rotated on the surface of the first sliding member between a fixed angle without interfering with each other.

It is to be understood that both the foregoing general description and the following detailed description are by examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
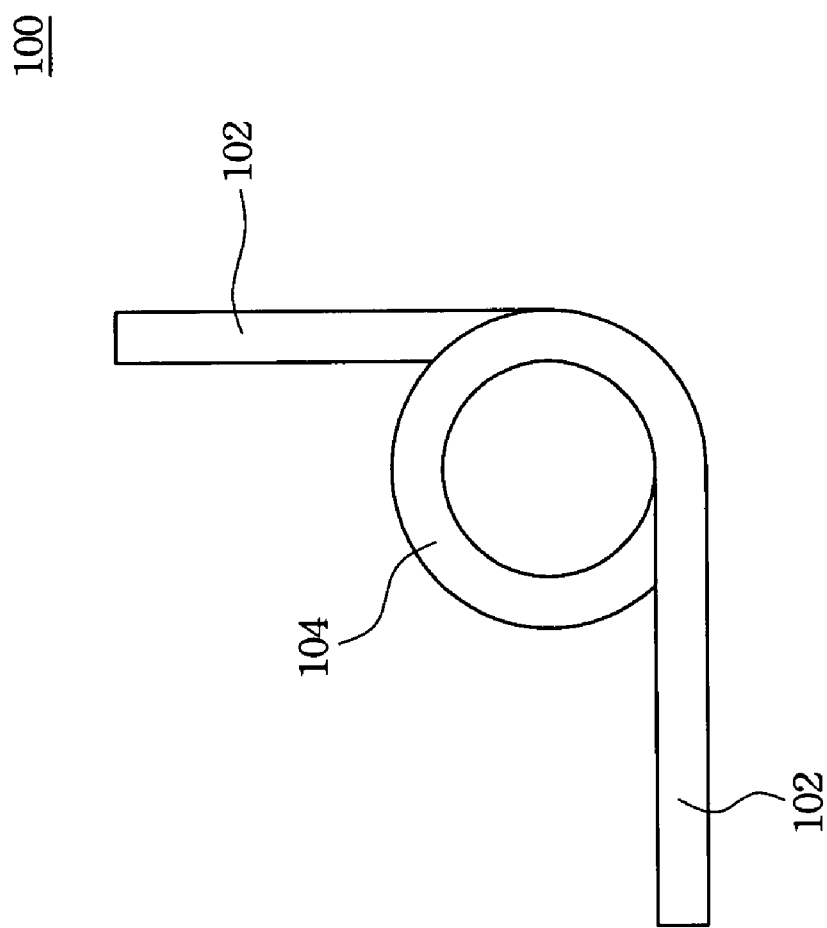
FIG. 1 depicts the torsion spring.

Reference will now be made in detail to the present preferred embodiments of the invention, examples of which are illustrated in the accompanying drawings. Wherever possible, the same reference numbers are used in the drawings and the description to refer to the same or like parts.

The semiautomatic sliding structure of the embodiments of the invention connects the guide member and the extension spring with the first sliding member and the second sliding member separately. Hence, the guide member and the extension spring tow the first sliding member and the second sliding member. Someone skilled in the art can change the connecting method or the type of the guide and the extension spring to satisfy the other design parameters.

Figure 2A:
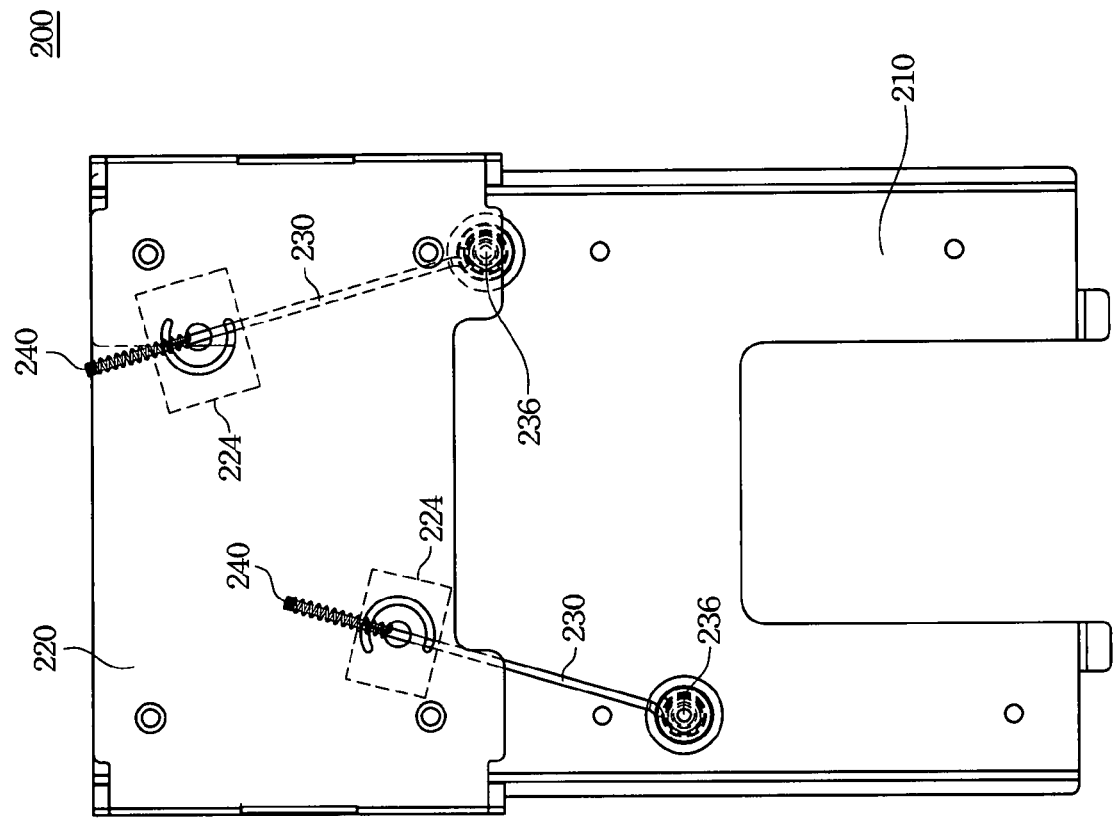
FIG. 2A depicts the embodiment of the semiautomatic sliding structure.
Figure 2B:
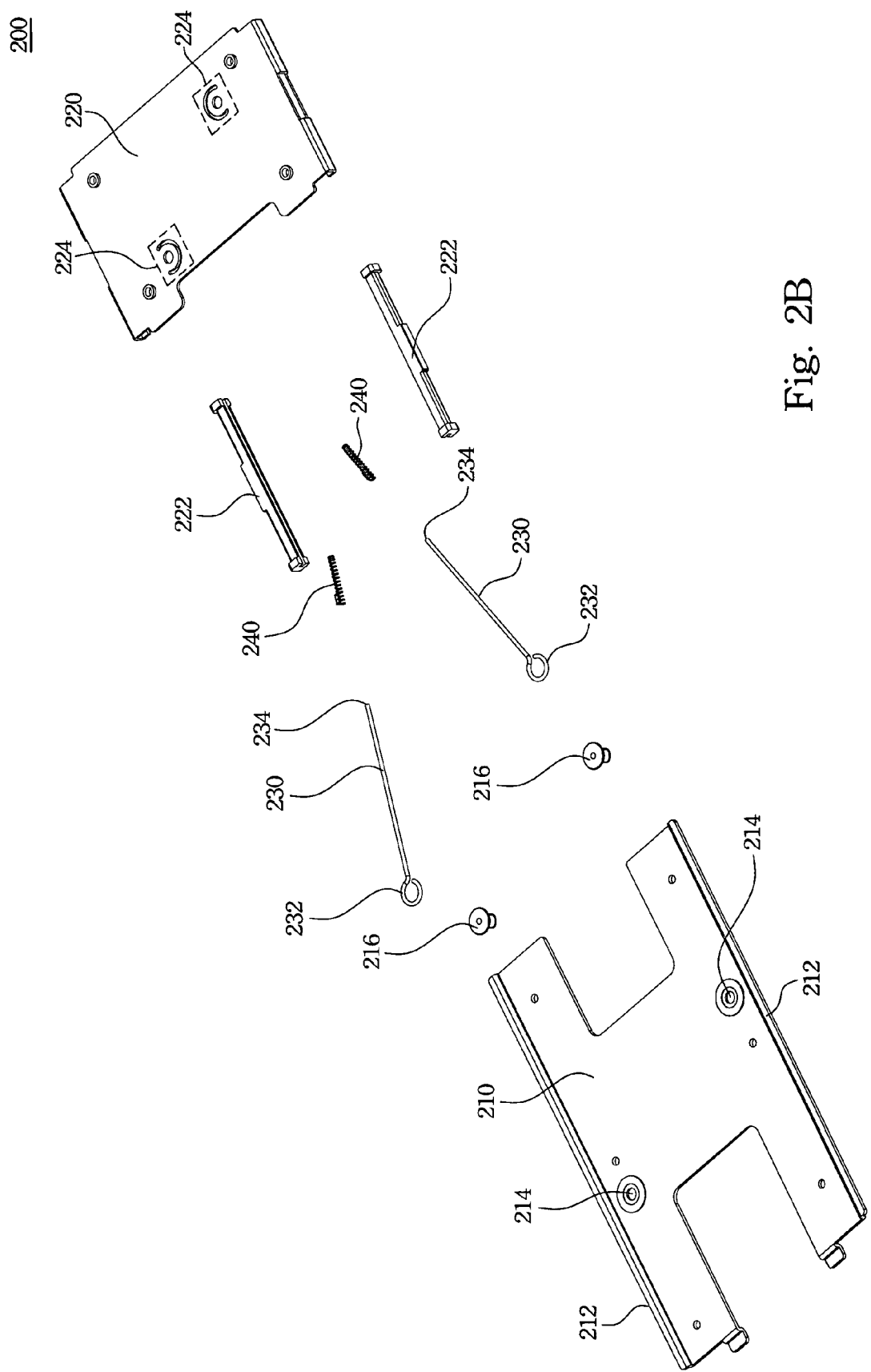
FIG. 2B depicts an exposed diagram of the semiautomatic sliding structure of the embodiment.

Please refer to FIG. 2A and FIG. 2B together. FIG. 2A depicts the embodiment of the semiautomatic sliding structure. FIG. 2B depicts an exposed diagram of the semiautomatic sliding structure of the embodiment. The semiautomatic sliding structure 200 includes a first sliding member 210, a second sliding member 220, a guide member 230, and an extension spring 240. The first sliding member 210 includes a first sliding structure 212. The second sliding member 220 is arranged on the first sliding structure 212. The second sliding member 220 has a second sliding structure 222 and a rotation structure 224. The second sliding structure 220 is arranged with respect to the first sliding structure 212 so that the second sliding member 220 and the first sliding member 210 can slide relative to each other. The guide member 230 is of a pillar shape and is arranged between the first member 210 and the second sliding member 220. The guide member 230 has a first end 232 and a second end 234. The first end 232 is pivoted on a pivot point 236 of the first sliding member 210 so that the guide member 230 can rotate on the surface of the first sliding member 210 between a fixed angle. Wherein the pivot point 236 is the rotation center when the guide member 230 is rotating.

Figure 3A:
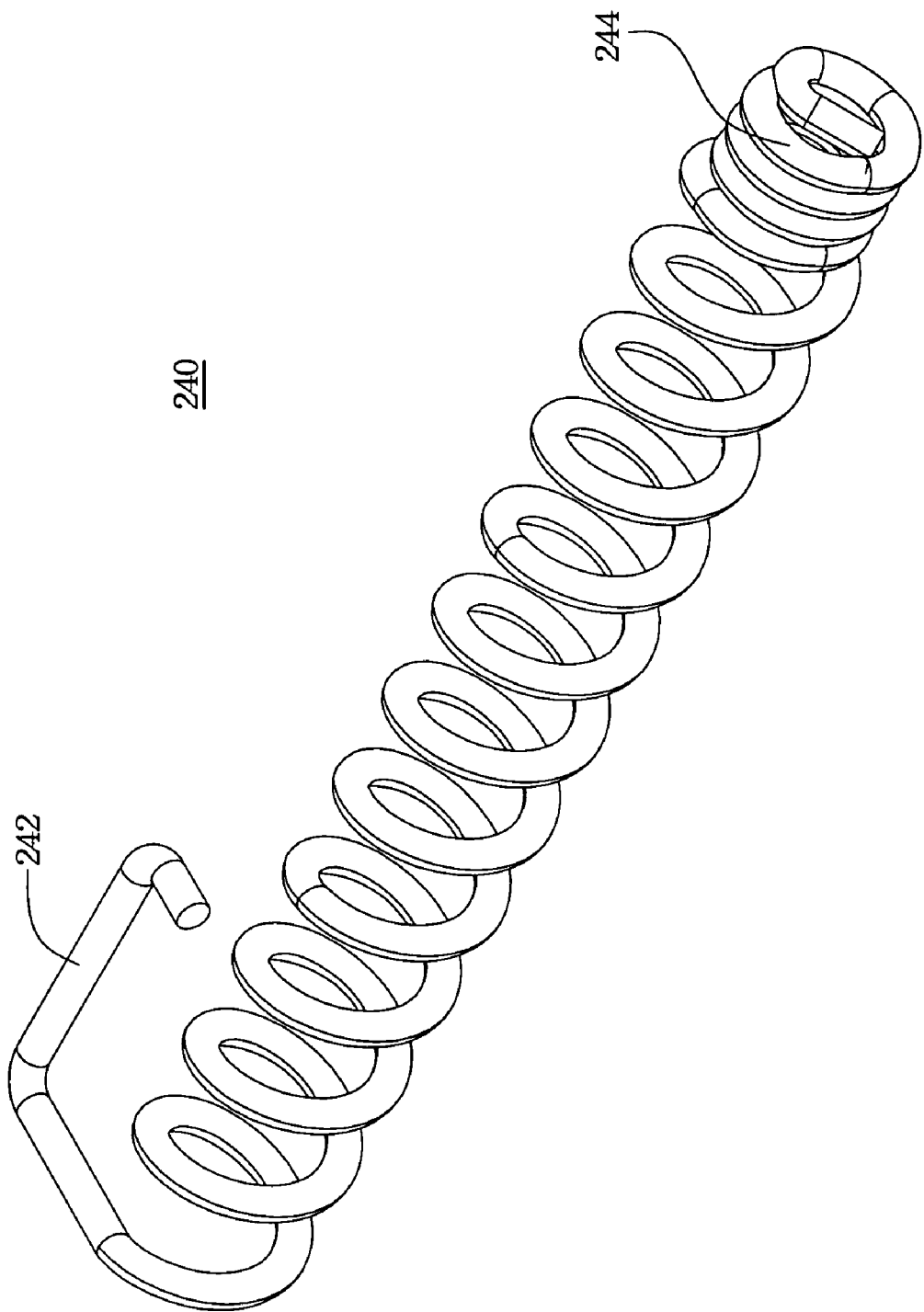
FIG. 3A depicts an enlargement diagram of the extension spring of the embodiment.

In order to describe the detail structure of the extension spring 240, please refer to FIG. 3A. FIG. 3A depicts an enlargement diagram of the extension spring 240 of the embodiment. The extension spring 240 is slipped onto the second end 234. The extension spring 240 has a stopper end 224 and a hook 242. The stopper end 244 and the hook 242 are arranged on two ends of the extension spring 240 respectively. The hook 242 is hooked on the rotation structure 224. The cross section area of the stopper end 244 side of the extension spring 240 is smaller than the cross section area of the hook 242 side of the extension spring 240, and the cross section area of the stopper end 244 is smaller than the cross section area of the guide member 230. Hence, the extension spring 240 can be mounted and slipped onto the second end 244.

Accordingly, when the first sliding member 210 and second sliding member 220 slide relative to each other, the guide member 230 is rotated together and the extension spring 240 will be extended and deformation. Moreover, the projective position of the rotation structure 224 on the first sliding member 210 is at a predetermined space in between when the first sliding member 210 and the second sliding member 220 are static or sliding relative to each other. Hence, the projective position of the rotation structure 224 of the first sliding member 210 is not connected with the pivot point when the first sliding member 210 and the second sliding member 220 are static or sliding relative to each other.

The semiautomatic sliding structure can work when only one guide member 230 and extension spring 240 are arranged in the semiautomatic sliding structure. However, in order to get better control feel and structure balance, the semiautomatic sliding structure includes a plurality of guide members 230 and extension springs 240 in this embodiment. Moreover, when the second sliding member 220 and the first sliding member 240 slide relatively with each other, these guide members 230 rotate on the surface of the first sliding member 210 between a fixed angle and do not interfere with each other.

The first end 232 of the guide member 230 is a loop structure. First sliding member 210 further includes a pivot hole 214 and a pillar member 216. The pillar member 216 is pierced through the first end 232 (loop structure) and mounted on the pivot hole 214. Hence, the guide member is pivoted on the first sliding member 210. Moreover, the position of the pivot hole 214 is the pivot point described above.

In addition, the first sliding structure 212 is a slide shaft, the second sliding structure 222 is a dismountable slide rail arranged on the second sliding member 220. The first sliding structure 212 (slide shaft) and the second sliding structure 222 (dismountable slide rail) cooperate with each other so that the first sliding member 210 and the second sliding member 220 can slide relative to each other.

Figure 3B:
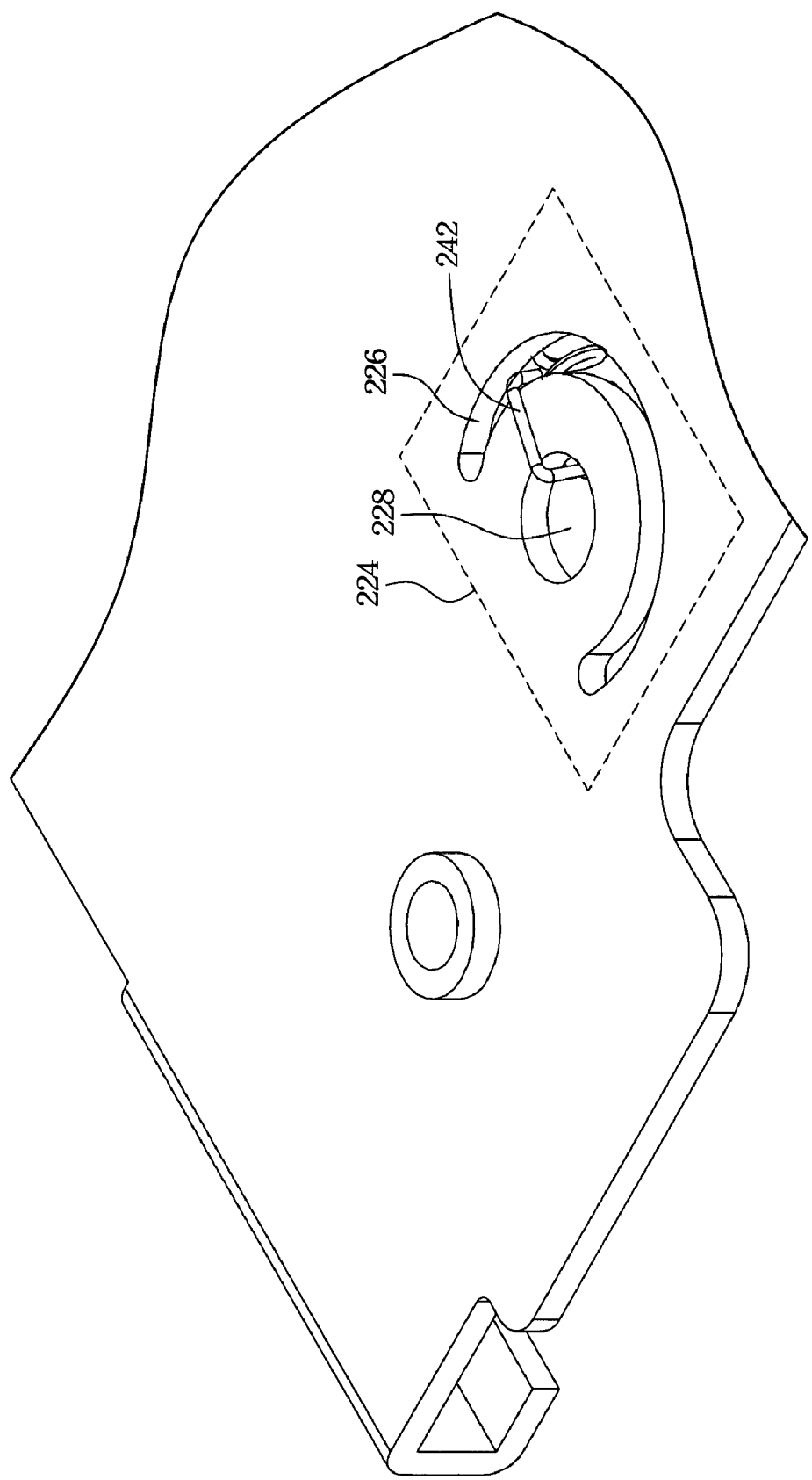
FIG. 3B is an enlargement diagram depicted the extension spring hooked on the rotation structure.

In order to describe the relationship with the hook 242 and the rotation structure 224, please refer to FIG. 3A and FIG. 3B together. The rotation structure 224 is composed of the round hole 228 and the arc opening 226 in this embodiment. The hook 242 is similar to a fishhook and hooked onto the arc opening 226. The arc opening 226 and the round hole 228 have a predetermined distance in between. Hence, the hook 242 pierces the round hole 228 and hooks onto the arc open 226 stably. Due to this hooking structure, when the guide member 230 is rotating, the hook 242 can move along the arc opening and prevents the extension spring 240 from dismounting from the rotation structure 224.

Figure 4:
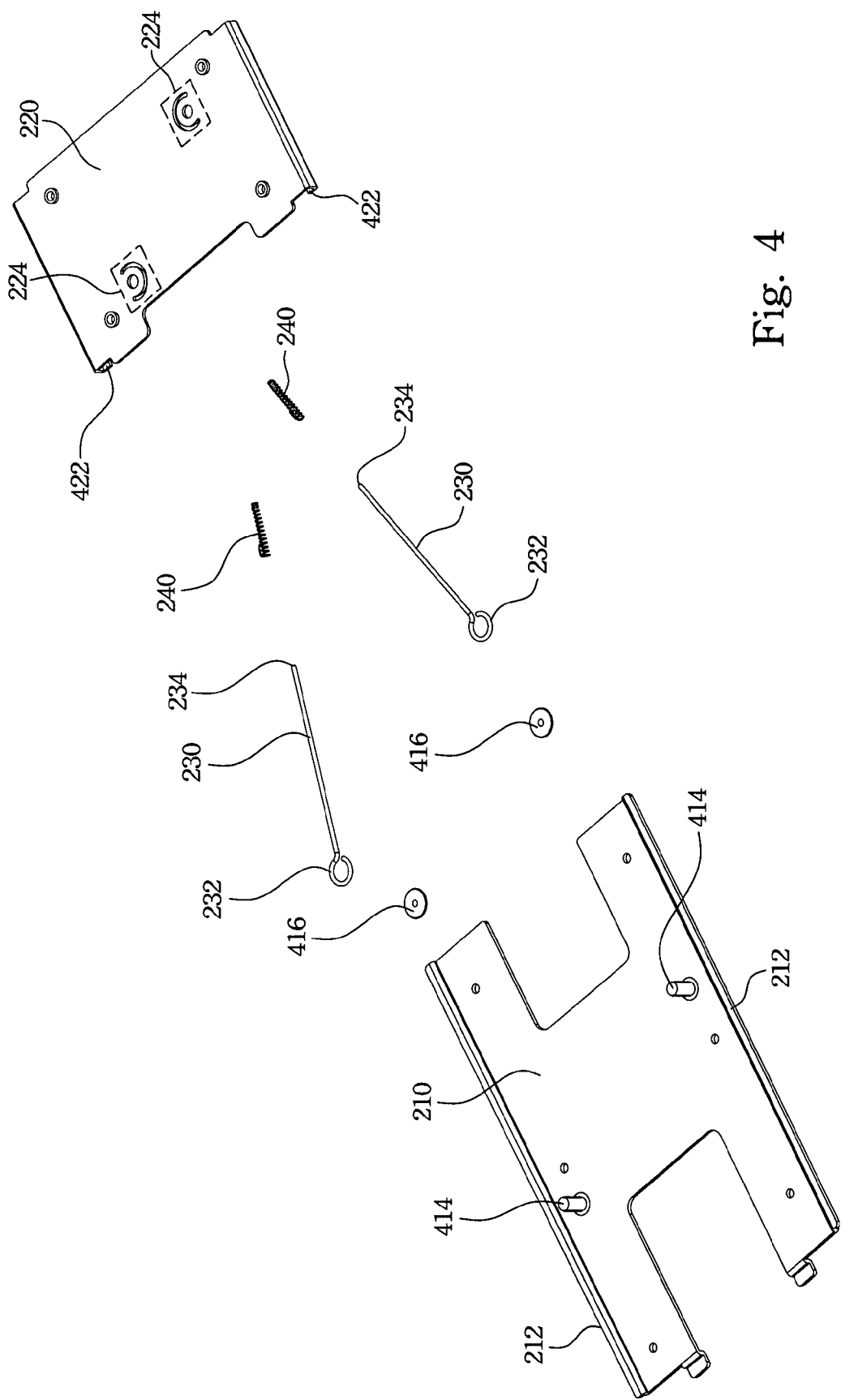
FIG. 4 depicts an exposed diagram of the semiautomatic sliding structure of another embodiment.

Please refer to FIG. 4. FIG. 4 depicts an exposed diagram of the semiautomatic sliding structure of another embodiment. In this embodiment, the first sliding member 210 further includes a pivot pillar 414 and a mounting member 416. The first end 232 of the guide member 230 is a loop structure same to the embodiment described above. The pivot pillar 414 is pierced through the first end 232 (loop structure). The mounting member 416 is mounted on the pivot pillar 414 to prevent the guide member 230 from disengaging from the pivot pillar. In this embodiment, the position of the pivot pillar 414 is the pivot point described above. Moreover, the second sliding structure 422 is a slide shaft, and the second sliding structure is a slide rail arranged on the second sliding member 220 directly in this embodiment.

Figure 5A:
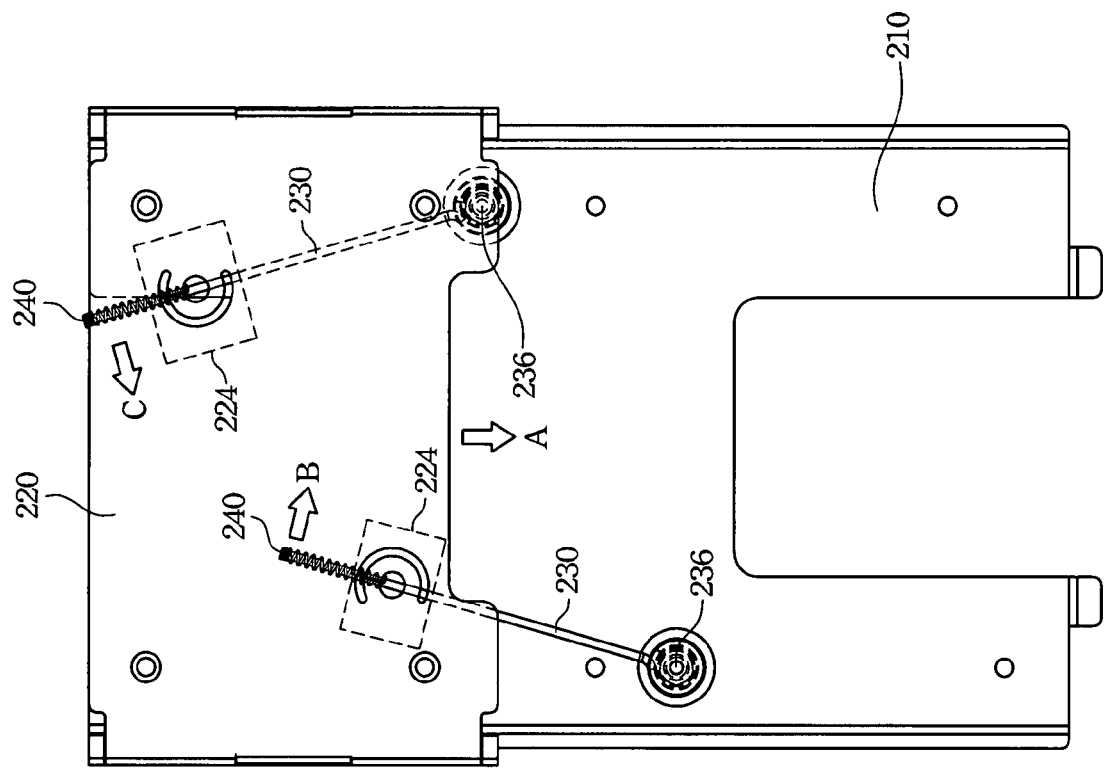
FIG. 5A to FIG. 5C are the working step diagrams of the semiautomatic sliding structure of the embodiment.
Figure 5B:
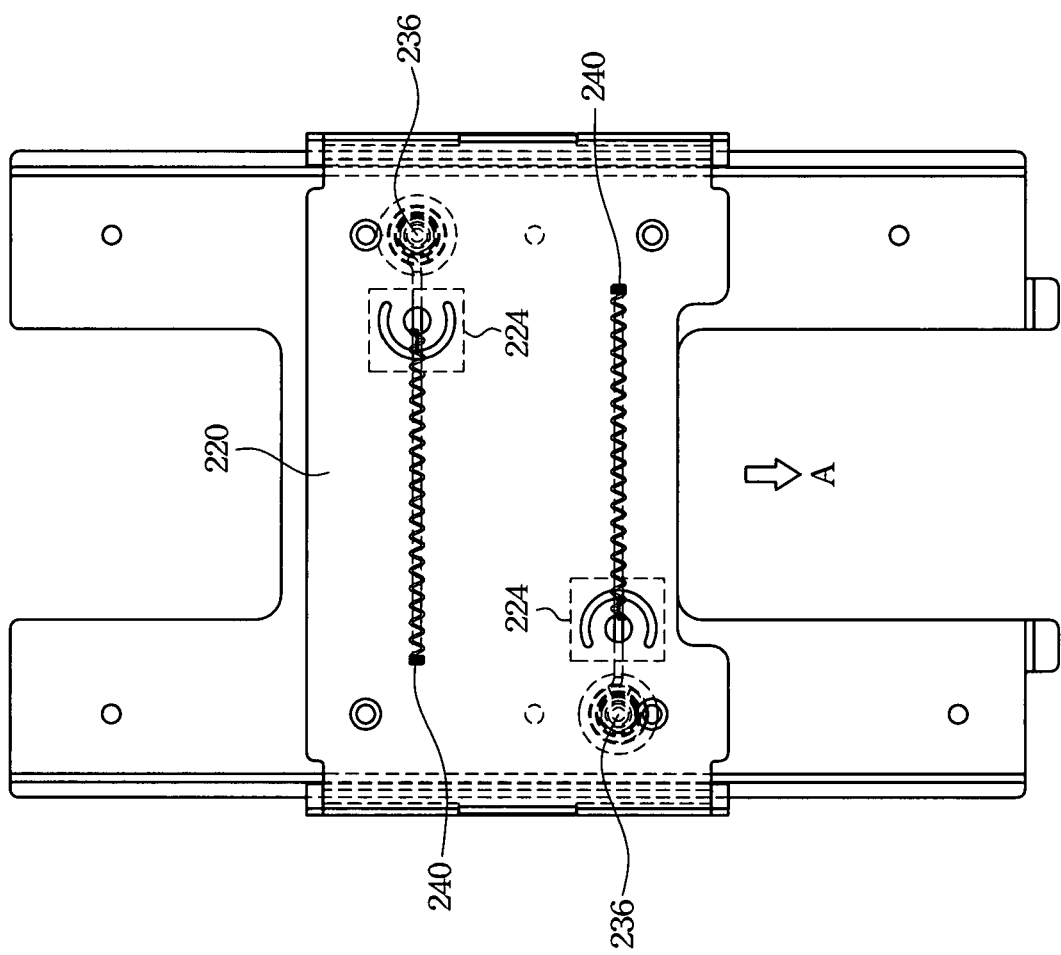
Figure 5C:
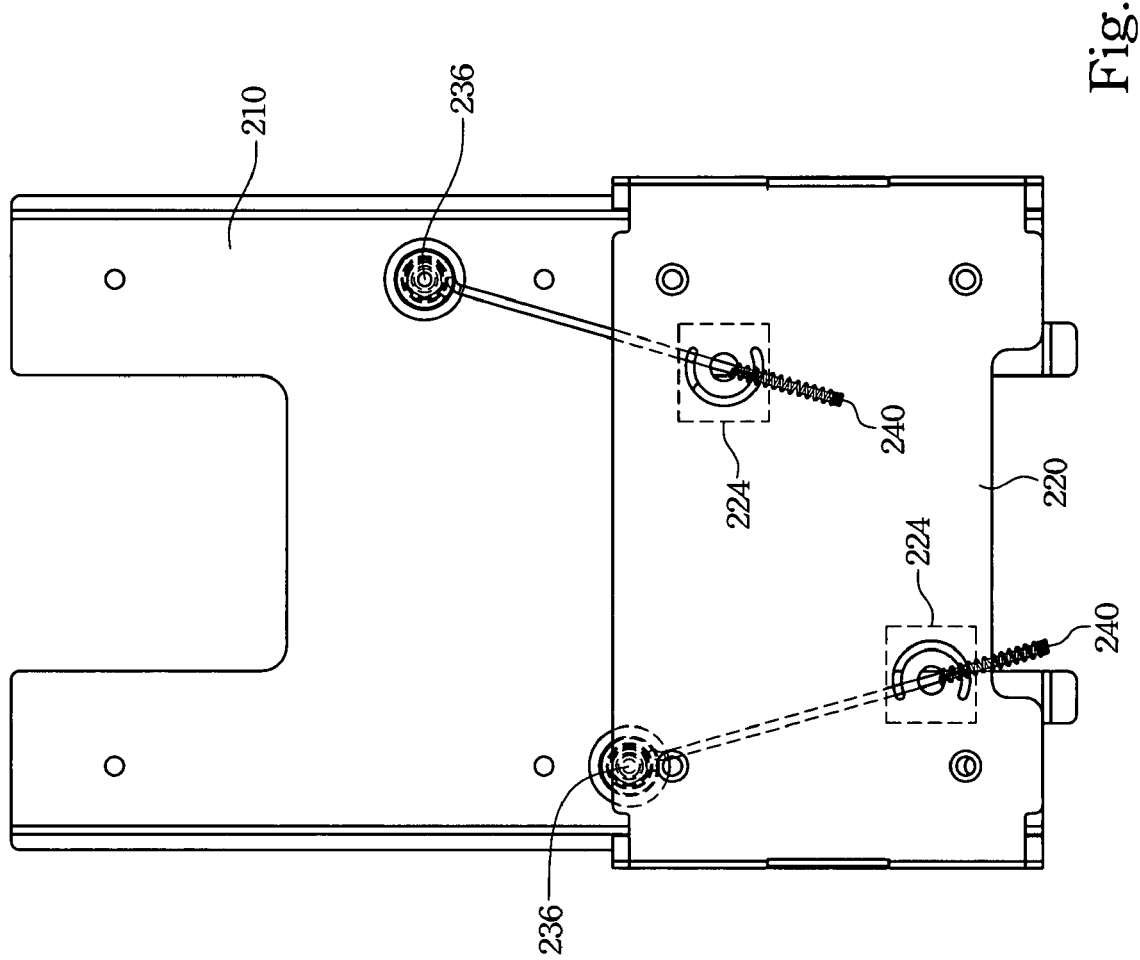

In order to emphasize advantages and practicability of the semiautomatic sliding structure of the embodiments, please refer to FIG. 5A to FIG. 5C together. These figures are the working step diagrams of the semiautomatic sliding structure of the embodiment. FIG. 5A is the initial state of the semiautomatic sliding structure. When the second sliding member 220 moves towards the direction of arrow A, the guide members 230 arranged on the two sides of the semiautomatic sliding structure rotate toward the directions of arrows B and C respectively. Because the extension springs 240 are slipped onto the guide member 230 and hooked onto the rotation structure 224, the distance between the rotation structure 224 and pivot point 236 reduces and the length of the extension spring 240 extends when the second sliding member 220 and the first sliding member 210 slide relative to each other.

In sequence, the distance between the rotation structure 224 and the pivot point 236 is shortest and the length of the extension spring 240 is longest in FIG. 5B. Hence, when the extension spring 240 is extended in FIG. 5B, the stopper end of the extension spring 240 abuts directly against the second end of the guide member. Then, the second sliding member 220 moves toward the direction of arrow A continuously, the distance between the rotation structure 224 and the pivot point 236 start to increase after the reduced process described above. Now, the extension spring 240 pulls the second sliding member 220 into the position shown in FIG. 5C according to the spring characteristic automatically, and finishes the semiautomatic sliding process of the second sliding member 220.

Accordingly, the guide member and the extension spring reach the semiautomatic sliding process of the sliding member. The extension spring can increase the life time of the electronic devices having the semiautomatic sliding structure based on the uniform deformation property.

Although the present invention has been described in considerable detail with reference to certain preferred embodiments thereof, other embodiments are possible. Therefore, their spirit and scope of the appended claims should not be limited to the description of the preferred embodiments container herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A semiautomatic sliding structure for an electronic device, comprising:
   a first sliding member having a first sliding structure;
   a second sliding member arranged on the first sliding member, the second sliding member having a second sliding structure and a rotation structure, the second sliding structure being arranged with respect to the first sliding structure so that the second sliding member and the first sliding member slide relative to each other;
   a guide member with a pillar shape arranged between the first sliding member and the second sliding member, the guide member having a first end and a second end, the first end being pivoted on a pivot point of the first sliding member so that the guide member rotates on the surface of the first sliding member between a fixed angle; and
   an extension spring wrapped around and coaxial with the second end, the extension spring having a stopper end and a hook, the stopper end and the hook being arranged on two ends of the extension spring respectively, the cross section area of the stopper end being smaller than the cross section area of the guide member, the hook being hooked on the rotation structure;
   wherein when the extension spring is extended, the stopper end of the extension spring abuts directly against the second end of the guide member.

2. The semiautomatic sliding structure of claim 1, wherein a projective position of the rotation structure on the first sliding member and the pivot point have a predetermined space in between.

3. The semiautomatic sliding structure of claim 1, wherein a projective position of the rotation structure on the first sliding member does not contact with the pivot point.

4. The semiautomatic sliding structure of claim 1, wherein the first end is a loop structure.

5. The semiautomatic sliding structure of claim 4, wherein the first sliding member further comprises a pivot hole and a pillar member, the pillar member pierced through the loop structure and being mounted on the pivot hole.

6. The semiautomatic sliding structure of claim 4, wherein the first sliding member further comprises a pivot pillar and a mounting member, the pivot pillar pierced through the loop structure, the mounting member mounted on the pivot pillar to prevent the guide member disengaging from the pivot pillar.

7. The semiautomatic sliding structure of claim 1, wherein the first sliding structure is a slide shaft.

8. The semiautomatic sliding structure of claim 7, wherein the second sliding structure is a dismountable slide rail arranged on the second sliding member.

9. The semiautomatic sliding structure of claim 7, wherein the second sliding structure is a slide rail.

10. The semiautomatic sliding structure of claim 1, wherein the rotation structure comprises a round hole and an arc opening, the arc opening and the round hole having a predetermined distance in between.

11. The semiautomatic sliding structure of claim 10, wherein the hook is similar to a fishhook, and hooked onto the arc opening.

12. A semiautomatic sliding structure for an electronic device, comprising:
   a first sliding member having a first sliding structure;
   a second sliding member being arranged on the first sliding member, the second sliding having a second sliding structure and a plurality of rotation structures, the second sliding structure arranged with respect to the first sliding structure so that the second sliding member and the first sliding member slide relative to each other;
   a plurality of extension springs arranged between the first sliding member and the second sliding member, each respective extension spring having a stopper end and a hook, the stopper end and the hook being arranged on two ends of the extension springs respectively, the cross section area of the stopper end side of the extension springs being smaller than the cross section area of the hook side of the extension springs, the hook being hooked onto the rotation structure; and
   a plurality of guide members having pillar shapes, the cross section area of each guide member being larger than the cross section area of the stopper end side of each extension spring, each guide member having a first end and a second end, the first end being pivoted on a pivot point of the first sliding member, each extension spring being wrapped around and coaxial with the second end, when the second sliding member and the first sliding member slide relative to each other, the guide members rotate on the surface of the first sliding member between a fixed angle without interfering with each other;
   wherein when the extension springs are extended, the stopper ends of the extension springs abut directly against the respective second ends of the guide members.

13. The semiautomatic sliding structure of claim 12, wherein the first end is a loop structure.

14. The semiautomatic sliding structure of claim 13, wherein the first sliding member further comprises a pivot hole and a pillar member, the pillar member pierced through the loop structure and mounted on the pivot hole.

15. The semiautomatic sliding structure of claim 13, wherein the first sliding member further comprises a pivot pillar and a mounting member, the pivot pillar pierced through the loop structure, the mounting member mounted on the pivot pillar to prevent the guide member from disengaging from the pivot pillar.

16. The semiautomatic sliding structure of claim 12, wherein the first sliding structure is a slide shaft.

17. The semiautomatic sliding structure of claim 16, wherein the second sliding structure is a dismountable slide rail arranged on the second sliding member.

18. The semiautomatic sliding structure of claim 16, wherein the second sliding structure is a slide rail.

19. The semiautomatic sliding structure of claim 12, wherein the rotation structure comprises a round hole and an arc opening, the arc opening and the round hole having a predetermined distance in between.

20. The semiautomatic sliding structure of claim 19, wherein the hook is similar to a fishhook, and hooked on the arc opening.

* * * * *